UNITED STATES PATENT OFFICE 2,627,490

INSECT REPELLENTS

Paul D. Bartlett, Weston, Mass., Hyp J. Dauben, Jr., Seattle, Wash., and Abraham Schneider, Philadelphia, Pa., assignors to the United States of America as represented by the Secretary of the Army No Drawing. Original application January 10, 1949, Serial No. 70,142. Divided and this application October 4, 1951, Serial No. 254,631

1 Claim. (Cl. 167—30)

This invention relates to insect repellents.

We have discovered that the application of an N-alkyl-substituted acyl anilide of the general formula

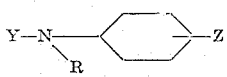

wherein Y is an aliphatic acyl group, Z is hydrogen or a methyl group, and R is a straight chain alkyl radical, effectively repels insects, particularly the *aedes aegypti* and *anopheles quadrimaculatus*, when such compound is applied to the human skin or a fabric.

Tests to measure the repellency of the above-mentioned compounds against insects by skin application were conducted by smearing the compound on the arms of test personnel, who then thrust their arms into cages containing insects. The arms were exposed for 30-minute intervals at 3 minutes each until the first insect bite.

Tests to measure the repellency of fabrics impregnated with the above-mentioned compounds against insects were conducted by uniformly impregnating mercerized cotton hose with the compound at a rate equivalent to 3.3 gms. per sq. ft., drawing the dried hose over the arms of test personnel, who then thrust their covered arms into cages containing insects for 1 to 2 minutes.

Examples of aliphatic acyl substituents whose attachment to the N atom of the anilide or toluidide (methyl ring-substituted anilide) confers insect-repellent properties, are formyl, acetyl and its higher homologues such as propionyl and butyryl and unsaturated acyl such as crotonyl groups; and examples of straight chain alkyl substituents for the remaining non-phenyl-substituted valence of the N atom of the anilide are the methyl, ethyl, propyl, n-propyl, and n-amyl groups.

We have found that the N-alkyl-substituted acyl anilides contemplated by our invention are freely soluble in liquid dialkyl phthalates, e. g. in dimethyl phthalate (a well known insect repellent) and that such solutions, e. g. solutions of the order of 20% or 50%, are more potent insect repellents than the dialkyl phthalate alone. Solutions of these anilides in an aliphatic dihydric alcohol, e. g. in 2-ethyl hexanediol-1,3, a well known insect repellent sold under the name of "Rutgers 612," also have excellent insect repellent properties.

The following table illustrates the results obtained by the above test methods against *aedes aegypti* and *anopheles quadrimaculatus*, as examples of insects against which the invention is applicable, by using compounds in accordance with the present invention:

|  | Repellency on application to skin | | Repellency of Impregnated Fabric against *Aedes aegypti* |
|---|---|---|---|
|  | *Aedes aegypti* | *Anopheles quadrimaculatus* |  |
|  | Minutes | Minutes |  |
| N-n-butyl formanilide | 236 | 42 | over 10 days. |
| N-ethyl formanilide | 190 | 60 | Do. |
| N-methyl acetanilide | (¹) | (¹) | Do. |
| N-ethyl acetanilide |  |  | over 35 days. |
| N-ethyl acetanilide (50% sol. in dimethyl phthalate) | 306 | 159 |  |
| N-ethyl acetanilide (50% sol. in 2-ethyl hexanediol-1,3) | 328 | 108 |  |
| N-propyl-acetanilide |  |  | over 36 days. |
| N-n-propyl acetanilide (50% sol. in dimethyl phthalate) | 308 | 237 |  |
| N-n-propyl acetanilide (50% sol. in 2-ethyl hexanediol-1,3) | 377 | 128 |  |
| N-n-amyl acetanilide | 369 | 55 | over 10 days. |
| N-methyl propionanilide | (¹) | (¹) | Do. |
| N-n-propyl propionanilide | 287 | 43 | Do. |
| N-n-butyl propionanilide | 303 | 55 | Do. |
| N-n-amyl propionanilide | 255 | 56 | Do. |
| N-methyl butyranilide | 227 | 77 | Do. |
| N-methyl crotonanilide | 260 | 42 | Do. |
| N-ethyl crotonanilide | (¹) | (¹) | Do. |
| N-methyl meta-acetotoluidide |  |  | Do. |

NOTE.—¹ Not determined.

It will be seen from the foregoing table that, generally speaking, the N-alkyl-substituted acyl anilides having two or more carbon atoms in the acyl group (N-alkyl-substituted acetanilide and its higher homologues), possess insect repellent properties superior to those of the N-alkyl-substituted formanilides.

The insect repellency of the foregoing compounds and solutions compares favorably with and in many instances is superior to the insect repellency of dimethyl phthalate, as is shown by "paired" tests, wherein the tester smeared one arm with the anilide and another arm with dimethyl phthalate and simultaneously exposed both arms to cage insects; a test method more fully described in Chemical Abstracts, vol. 39, p.

3385. The following values were noted (repellency figures in minutes; upper figure relates to anilide, lower figure to dimethyl phthalate):

| | Repellency on application to skin, Aedes aegypti | Repellency on application to skin, Anopheles quadrimaculatus |
|---|---|---|
| N-n-butyl formanilide | 250 / 197 | 39 / 47 |
| N-ethyl acetanilide (50% sol. in dimethyl phthalate) | 306 / 254 | 159 / 136 |
| N-n-propyl acetanilide (50% sol. in dimethyl phthalate) | 308 / 282 | 237 / 192 |
| N-n-amyl acetanilide | 378 / 235 | 45 / 71 |
| N-n-propionanilide | 229 / 228 | 48 / 107 |
| N-methyl butyranilide | 226 / 198 | 98 / 52 |
| N-methyl crotonanilide | 269 / 256 | 54 / 60 |

We are aware that several N-alkyl-substituted acyl anilides are known to the art as insecticides when used jointly with a plant toxicant such as pyrethrum or rotenone (see U. S. Pats. No. 2,368,195, Britton et al., and No. 2,386,779, Coleman et al.); however, it is well known that the insecticidal properties of a substance permit no prediction of its value as an insect repellent, and vice versa.

For ease of application the N-alkyl-substituted acyl anilides contemplated by the present invention may be incorporated in a suitable inert liquid or solid carrier, such as mineral oil, alcohol, petrolatum, etc. For facile and uniform fabric impregnation, they may be applied in an inert solvent, such as alcohol, ether, etc.

This application is a division of our copending application Ser. No. 70,142, filed January 10, 1949 (now abandoned).

Having thus fully described our invention, we claim:

An *aedes aegypti* repellent composition for application to the skin, comprising N-n-amyl acetanilide and a non-toxic insect-repellent-adjuvant as a carrier therefor.

PAUL D. BARTLETT.
HYP J. DAUBEN, JR.
ABRAHAM SCHNEIDER.

REFERENCES CITED

The following references are of record in the file of this patent:

OSRD Insect Control Committee Report—Number 28, Interim Report Number O-94, May 18, 1945, publication date August 1, 1947, 50 pages, pages 1 to 4, 9, 14, 37 considered especially pertinent.

Linduska et al., "Flea Repellents for Use on Clothing," J. Economic Entomology, December 1946, pages 767 to 769.